(12) United States Patent
Nishimura

(10) Patent No.: US 11,769,924 B2
(45) Date of Patent: Sep. 26, 2023

(54) ENERGY STORAGE APPARATUS

(71) Applicant: GS Yuasa International Ltd., Kyoto (JP)

(72) Inventor: Yosuke Nishimura, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 455 days.

(21) Appl. No.: 17/253,549

(22) PCT Filed: Jun. 21, 2019

(86) PCT No.: PCT/JP2019/024690
§ 371 (c)(1),
(2) Date: Dec. 17, 2020

(87) PCT Pub. No.: WO2019/245023
PCT Pub. Date: Dec. 26, 2019

(65) Prior Publication Data
US 2021/0273301 A1 Sep. 2, 2021

(30) Foreign Application Priority Data

Jun. 22, 2018 (JP) .................................. 2018-118983
Aug. 21, 2018 (JP) .................................. 2018-154665

(51) Int. Cl.
*H01M 50/264* (2021.01)
*H01M 50/262* (2021.01)
(Continued)

(52) U.S. Cl.
CPC .......... *H01M 50/264* (2021.01); *H01G 11/12* (2013.01); *H01G 11/78* (2013.01);
(Continued)

(58) Field of Classification Search
None
See application file for complete search history.

(56) References Cited

U.S. PATENT DOCUMENTS

2014/0127553 A1 5/2014 Ishibashi et al.
2014/0287291 A1 9/2014 Miyawaki et al.
(Continued)

FOREIGN PATENT DOCUMENTS

JP 2011-126396 A 6/2011
JP 2014-093278 A 5/2014
(Continued)

OTHER PUBLICATIONS

International Search Report (ISR) (PCT Form PCT/ISA/210), in PCT/JP2019/024690, dated Sep. 17, 2019.

*Primary Examiner* — Gregg Cantelmo
(74) *Attorney, Agent, or Firm* — McGinn I.P. Law Group, PLLC

(57) ABSTRACT

A holding member holding an energy storage device is provided with: a first frame including an end member aligned with the energy storage device, and an attachment portion connected to the end member; a second frame including a body aligned with the energy storage device, and an extension extending from the body and extending along the outer surface of the end member; and a plurality of coupling portions that couple the first frame and the second frame in a first direction and disposed in the extension at an interval in a second direction. The attachment portion includes an installation portion that is installed on a fixing surface. The other coupling portion is further apart from a center line extending in the second direction of the end member than a coupling portion closest to the installation portion.

7 Claims, 14 Drawing Sheets

(51) Int. Cl.
  H01M 50/209  (2021.01)
  H01M 50/244  (2021.01)
  H01M 50/249  (2021.01)
  H01G 11/82   (2013.01)
  H01G 11/12   (2013.01)
  H01G 11/78   (2013.01)

(52) U.S. Cl.
  CPC .......... *H01G 11/82* (2013.01); *H01M 50/209* (2021.01); *H01M 50/244* (2021.01); *H01M 50/249* (2021.01); *H01M 50/262* (2021.01)

(56) References Cited

U.S. PATENT DOCUMENTS

| | | | |
|---|---|---|---|
| 2014/0295227 A1 | 10/2014 | Aoki | |
| 2016/0036088 A1 | 2/2016 | Tononishi | |
| 2017/0033336 A1* | 2/2017 | Hoshino | ............. H01M 50/291 |
| 2017/0084885 A1 | 3/2017 | Tononishi | |
| 2017/0352850 A1* | 12/2017 | Nagane | ............... H01M 50/236 |
| 2018/0151859 A1 | 5/2018 | Aizawa | |

FOREIGN PATENT DOCUMENTS

| | | | |
|---|---|---|---|
| JP | 2014-182946 A | 9/2014 | |
| JP | 2015-043293 A | 3/2015 | |
| JP | 2016-035906 A | 3/2016 | |
| JP | 2017-004803 A | 1/2017 | |
| JP | 2017-059510 A | 3/2017 | |
| WO | WO 2013/073046 A1 | 5/2013 | |
| WO | WO 2017/006763 A1 | 1/2017 | |
| WO | WO-2018230390 A1 * | 12/2018 | ............. H01G 11/82 |

* cited by examiner

ENERGY STORAGE APPARATUS

CROSS-REFERENCE TO RELATED APPLICATIONS

This application claims priority to Japanese Patent Application No. 2018-118983 and Japanese Patent Application No. 2018-154665, and the contents of Japanese Patent Application No. 2018-118983 and Japanese Patent Application No. 2018-154665 are incorporated herein by reference.

TECHNICAL FIELD

The present invention relates to an energy storage apparatus including an energy storage device and a holding member that holds the energy storage device.

BACKGROUND ART

An assembled battery used in a hybrid vehicle or an electric vehicle includes a battery stack, a restraint member, a battery monitoring board, a bus bar module, and a fixing member (cf. JP-A-2017-4803).

The battery stack is constituted by stacking flat battery cells. The plurality of battery cells are electrically connected in series. The battery cell is, for example, a nickel hydrogen secondary battery, a lithium ion secondary battery, and an organic radical battery.

Hereinafter, a direction in which the battery cells are stacked is referred to as a stacking direction. A direction orthogonal to the stacking direction and along the long side of the rectangular battery cell is called a longitudinal direction. A direction orthogonal to the stacking direction and along the short side of the rectangular battery cell is called a vertical direction.

An outer case for the battery cell has a thin flat plate shape. An electrode layered product, an electrolyte, a terminal connection portion, a part of a positive electrode terminal, and a part of a negative electrode terminal are built in the internal space of the outer case.

The fixing member is a member for fixing the battery stack to a predetermined installation location. The fixing member is provided on each surface in the stacking direction of the battery stack. The fixing member is coupled to the installation location, and both end portions of the restraint member are fixed. The fixing member includes a first plate and a second plate.

The first plate and the second plate are fixed in an overlapped state. The first plate located inside is coupled to the restraint member. The second plate located outside is fixed to the installation location. In the present embodiment, the installation location is located below the assembled battery. Therefore, the lower portion of the second plate is bent outward, and a through hole is formed. The fixing member is fixed to the installation location by a bolt inserted into the through hole.

The restraint member restrains both surface portions of the battery stack in a state of being pressed in the stacking direction. The restraint member is a member extending in the stacking direction, and both end portions are bent inward. Hence, the restraint member is formed in a U-shaped cross section as viewed in the vertical direction. This end portion is fixed to the fixing member. Specifically, a hole is formed in the first plate, and a hole is also formed in the bent portion of the restraint member. A bolt is provided through the hole, and the restraint member and the first plate are coupled. By tightening the bolt, the battery stack is pressed in the stacking direction. Two each of restraint members are provided in the vertical direction on one side at an interval, and a total of four restraint members are provided.

In this type of assembled battery, the battery stack (battery cell) extends and contracts in the stacking direction in accordance with charge-discharge. Therefore, when the battery stack comes into an extended state, the fixing member is energized in the stacking direction. In this type of assembled battery, when vibration or the like is received, the battery stack (battery cells) may energize the fixing member in the stacking direction.

Then, the fixing member fixed to the installation location via the bolt is to tilt with the bolt side (installation-position side) as a fulcrum. Accordingly, the fixing member is to move in the stacking direction on the side opposite to the installation-position (bolt) side from the installation-position (bolt) side. Thus, a force (force in the stacking direction) larger than that of the restraint member at a position close to the installation location of the fixing member acts on the restraint member at a position far from the installation location of the fixing member via the bolt coupling the restraint member and the fixing member in the stacking direction.

As a result, in the conventional assembled battery, a larger bending stress acts on the periphery of the boundary portion between the restraint member and the fixing member located far from the installation location (specifically, the periphery of the ridgeline on which the base end of the bent portion of the restraint member is located) than on the periphery of the boundary portion between the restraint member and the fixing member located near the installation location (specifically, the periphery of the ridgeline on which the base end of the bent portion of the restraint member is located).

In other words, in the conventional assembled battery, local stress concentration occurs around the boundary portion between the fixing member and the restraint member, which are aligned with the energy storage device in different directions and coupled to each other via a coupling portion.

PRIOR ART DOCUMENT

Patent Document

Patent Document 1: JP-A-2017-4803

SUMMARY OF THE INVENTION

Problems to be Solved by the Invention

It is an object of the present embodiment to provide an energy storage apparatus that can prevent the occurrence of local stress concentration around the boundary portion between a first frame and a second frame, which are aligned with an energy storage device in different directions and are coupled to each other via a coupling portion.

Means for Solving the Problems

An energy storage apparatus of the present embodiment includes: at least one energy storage device; and a holding member that holds the energy storage device. The holding member includes: a first frame including an end member aligned with the energy storage device in a first direction and an attachment portion connected to one end of the end member in a second direction orthogonal to the first direction; a second frame including a body aligned with the energy storage device in a third direction orthogonal to the first direction and the second direction and an extension extending from the body and extending along at least an outer surface of the end member; and a plurality of coupling portions that couple the first frame and the second frame in the first direction and are disposed in the extension at an interval in the second direction. The attachment portion includes an installation portion that is installed on a fixing surface to which the first frame is fixed. The plurality of coupling portions include a coupling portion closest to the installation portion and the other coupling portion in a view of the first direction of the first frame. The other coupling portion is further apart from a center line extending in the second direction of the end member in the third direction than the coupling portion closest to the installation portion.

MODE FOR CARRYING OUT THE INVENTION

Figure 1:
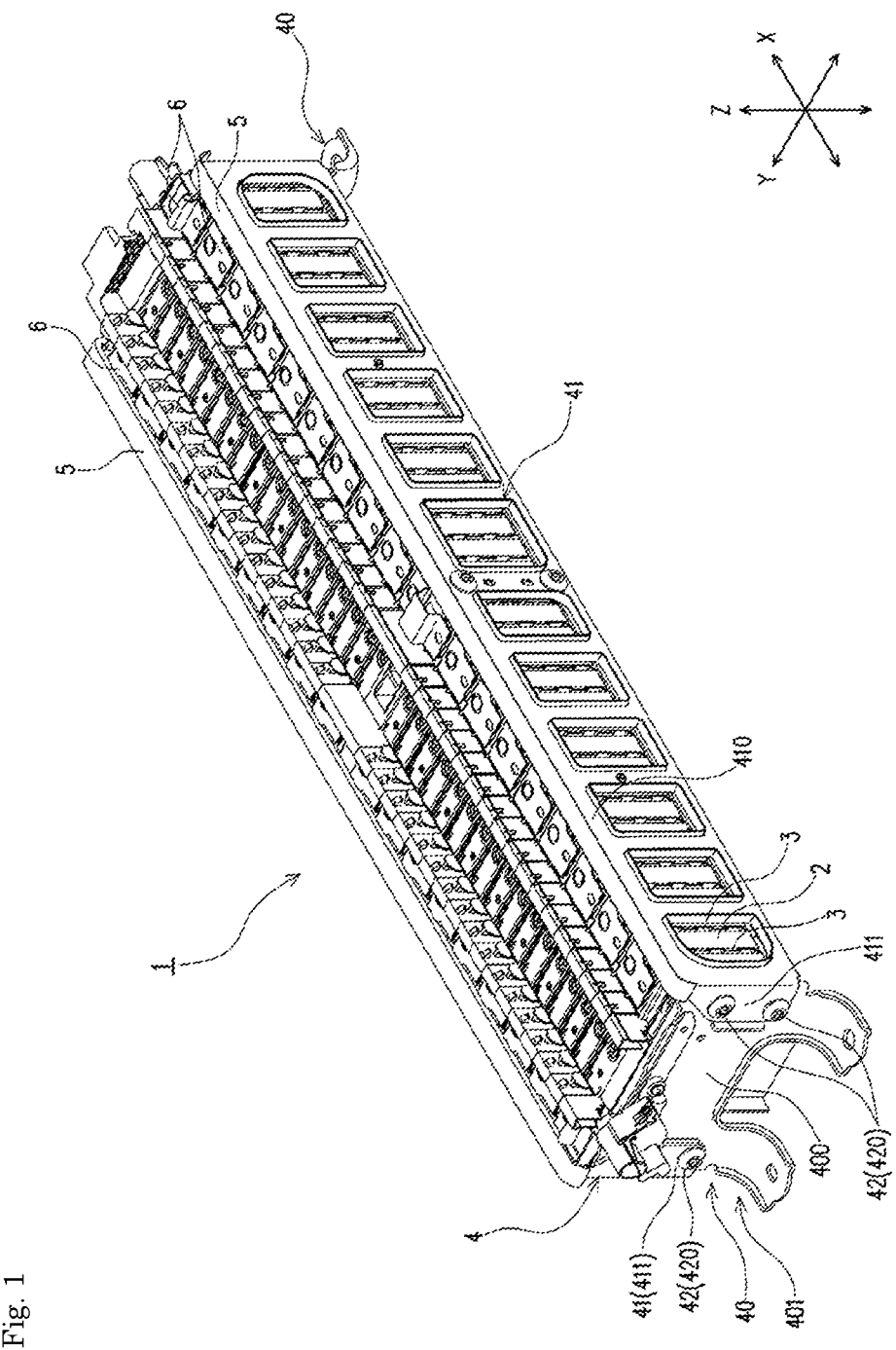
FIG. 1 is a perspective view of an energy storage apparatus according to the present embodiment.

An energy storage apparatus of the present embodiment includes: at least one energy storage device; and a holding member that holds the energy storage device. The holding member includes: a first frame including an end member aligned with the energy storage device in a first direction and an attachment portion connected to one end of the end member in a second direction orthogonal to the first direction; a second frame including a body aligned with the energy storage device in a third direction orthogonal to the first direction and the second direction and an extension extending from the body and extending along at least an outer surface of the end member; and a plurality of coupling portions that couple the first frame and the second frame in the first direction and are disposed in the extension at an interval in the second direction. The attachment portion includes an installation portion that is installed on a fixing surface to which the first frame is fixed. The plurality of coupling portions include a coupling portion closest to the installation portion and the other coupling portion in a view of the first direction of the first frame. The other coupling portion is further apart from a center line extending in the second direction of the end member in the third direction than the coupling portion closest to the installation portion.

With the above configuration, when the energy storage device energizes the end member of the first frame in the first direction due to an external factor such as vibration, the expansion of the energy storage device during charge, or the like, the first frame is to fall outward with the installation portion as a fulcrum. In this state, the amount of the displacement in the first direction on the side (the other end side of the end member) opposite to the installation portion side of the first frame in the second direction is proportionally larger than the amount of displacement in the first direction on the installation portion side of the first frame.

However, each of the plurality of coupling portions transmitting a force in the first direction is at a position near the boundary portion between the extension and the body. This reduces a bending moment of the boundary portion between the extension and the body.

In addition, since the other coupling portion is further apart from the center line extending in the second direction of the endmember than the coupling portion closest to the installation portion, the bending moments caused by the forces acting on the peripheries of the respective coupling portions (the bending moments of the connection parts between the body and the extension) numerically come close, and consequently, the bending stresses also numerically come close.

Specifically, as the first frame is energized by the energy storage device, the other end side of the end member in the second direction is to tilt more than the installation portion. Thus, a force larger than a force acting on the coupling portion, which is on the installation portion side, acts on the coupling portion, which is on the other end side of the end member. In contrast, the distance from the coupling portion being on the other end side of the end member to the boundary portion between the body and the extension is shorter than the distance from the coupling portion being on the installation portion side to the boundary portion between the body and the extension. The bending moment is obtained from the product of the force and the distance, so that the bending moments caused by the forces acting on the peripheries of the respective coupling portions (the bending moments of the connection parts between the body and the extension) come close to each other, and consequently, the bending stresses also come close to each other. It is thus possible to prevent the occurrence of local stress concentration around the boundary portion between the first frame and the second frame, which are aligned with the energy storage device in different directions and coupled to each other via the coupling portion.

In the energy storage apparatus, the other coupling portion may be disposed on an imaginary straight line passing through the coupling portion closest to the installation portion and a fixing center of the installation portion in the view of the first direction of the first frame.

With the above configuration, the imaginary straight line approaches the boundary portion between the body and the extension in a proportional manner.

Therefore, the distance from each of the plurality of coupling portions disposed on the imaginary straight line to the boundary portion between the body and the extension is a distance corresponding to the position of each of the plurality of coupling portions in the second direction. That is, the coupling portion at a position farther from the installation position in the second direction has a shorter distance to the boundary portion between the body and the extension.

In contrast, the force in the first direction acting in association with the tilting of the first frame is proportionally larger at a position farther from the installation position in the second direction.

Therefore, in the energy storage apparatus of the above configuration, as a result of obtaining a balance between the forces in the first direction acting on the respective coupling portions and the distances in the third direction from the respective coupling portions to the boundary portion between the body and the extension, the values of the bending moments at the positions corresponding to the respective coupling portions at the boundary portion between the body and the extension come close or become uniform. Thereby, the values of the bending stresses at the positions corresponding to the respective coupling portions also come close or become uniform.

In the energy storage apparatus, the first frame may include a pair of first frames disposed on both sides of the at least one energy storage device in the first direction, the second frame may include a pair of second frames disposed on both sides of the at least one energy storage device in the third direction, and the plurality of coupling portions coupling one of the second frames and the first frame and the plurality of coupling portions coupling the other of the second frames and the first frame may be symmetrically disposed with respect to a center line extending in the second direction of the end member of the first frame.

With the above configuration, the energizing force of the energy storage device acting on the end member of the first frame acts equally or substantially equally on one second frame side and the other second frame side. This makes uniform the value of the bending moment (bending stress) around the boundary portion between the one second frame and the first frame and the value of the bending moment (bending stress) around the boundary portion between the other second frame and the first frame. Therefore, the concentration of a stress on the periphery of any of the coupling portions coupling the first frame and the second frame is prevented.

In this case, the attachment portion may include a pair of legs disposed at an interval in the third direction and each extending in the second direction from the one end of the end member, and each of the pair of legs may have a first end connected to the one end of the end member and including an extending portion that extends in the second direction from the one end of the end member, and a second end opposite to the first end and including the installation portion.

In this way, the end member is disposed at a position apart from the fixing surface by the pair of legs, so that the energy storage devices arranged in the first direction with respect to the end members are also disposed at positions apart from the fixing surface. This improves the heat dissipation of the energy storage device.

As described above, when the energizing force by the energy storage device acts on the end member at a position apart from the fixing surface due to the presence of the legs, tilting occurs in accordance with the length of each of the legs. Hence, variations in stress (bending moment) tend to occur in each of the plurality of coupling portions.

However, according to the present embodiment, as described above, as a result of obtaining a balance between the forces in the first direction acting on the respective coupling portions and the distances in the third direction from the respective coupling portions to the boundary portion between the body and the extension, the values of the bending moments at the positions corresponding to the respective coupling portions at the boundary portion between the body and the extension come close or become uniform. Therefore, even when the first frame has legs for disposing the end member apart from the fixing surface, the values of the bending stresses at the positions corresponding to the respective plurality of coupling portions come close or become uniform.

In the energy storage apparatus, at a side end portion that is an end portion in the end member and the extending portion in the third direction, a first site including an end portion on the installation portion side in the second direction and a second site adjacent to the first site in the second direction may bend toward the sides opposite to each other with respect to a site adjacent to the side end portion in the third direction at the end member and the extending portion, and a boundary portion between the first site and the second site may be twisted.

With such a configuration, the boundary portion between the first site and the second site of the side end portion in the end member and the extending portion is twisted and thus has a spring property, whereby the boundary portion extends (deforms so that the twist returns) when the end member is pressed by the energy storage device by application of vibration or the like to the energy storage apparatus, while the installation portion is installed on the fixing surface, and the end member is to deform so that the installation portion tilts to the fulcrum. Thereby, a stress caused by the pressing is absorbed, and as a result, damage to the end member is prevented.

In the energy storage apparatus, the leg may extend from a tip of the extending portion along the first direction and may further include the installation portion in a plate shape along a plane including the first direction and the third direction, and an installation-portion side end portion being the end portion in the third direction in the installation portion may be continuous with the first site and bent toward a side where the first site is located with respect to a site adjacent to the installation-portion side end portion in the installation portion in the third direction.

With such a configuration, since the end portion in the third direction of the first frame including the boundary portion between the extending portion and the installation portion (the first site and the installation-portion side end portion) is bent with respect to the site adjacent to the end portion in the third direction in a state continuous with the first site, the strength of the boundary portion between the extending portion and the installation portion can be ensured.

Further, an energy storage apparatus of another embodiment includes: at least one energy storage device; and a holding member that holds the energy storage device. The holding member includes: a first frame including an end member aligned with the energy storage device in a first direction and an attachment portion connected to one end of the end member in a second direction orthogonal to the first direction; a second frame including a body aligned with the energy storage device in a third direction orthogonal to the first direction and the second direction, and an extension extending from the body and extending along at least an outer surface of the end member; and a plurality of coupling portions that couple the first frame and the second frame in the first direction and are disposed in the extension at an interval in the second direction. The attachment portion includes an installation portion that is installed on a fixing surface to which the first frame is fixed. The plurality of coupling portions include a coupling portion farthest from the installation portion and the other coupling portion in a view of the first direction of the first frame. The coupling portion farthest from the installation portion is further away from a center line extending in the second direction of the end member in the third direction than the other coupling portion. The other coupling portion is disposed on an imaginary straight line passing through the coupling portion farthest from the installation portion and the fixing center of the installation portion in the view of the first direction of the first frame.

With the above configuration, the imaginary straight line approaches the boundary portion between the body and the extension in a proportional manner.

Therefore, the distance from each of the plurality of coupling portions disposed on the imaginary straight line to the boundary portion between the body and the extension is a distance corresponding to the position of each of the plurality of coupling portions in the second direction. That is, the coupling portion at a position farther from the installation position in the second direction has a shorter distance to the boundary portion between the body and the extension.

In contrast, the force in the first direction acting in association with the tilting of the first frame is proportionally larger at a position farther from the installation position in the second direction.

Therefore, in the energy storage apparatus of the above configuration, as a result of obtaining a balance between the forces in the first direction acting on the respective coupling portions and the distances in the third direction from the respective coupling portions to the boundary portion between the body and the extension, the values of the bending moments at the positions corresponding to the respective coupling portions at the boundary portion between the body and the extension come close or become uniform. Thereby, the values of the bending stresses at the positions corresponding to the respective coupling portions also come close or become uniform.

According to the energy storage apparatus described above, it is possible to provide an energy storage apparatus that can prevent the occurrence of local stress concentration around the boundary portion between a first frame and a second frame, which are aligned with an energy storage device in different directions and are coupled to each other via a coupling portion.

One embodiment of the present invention will be described below with reference to the accompanying drawings. Note that the name of each constituent member (each constituent element) in the present embodiment is one in the present embodiment and may be different from the name of each constituent member (each constituent element) in the background art.

Figure 2:
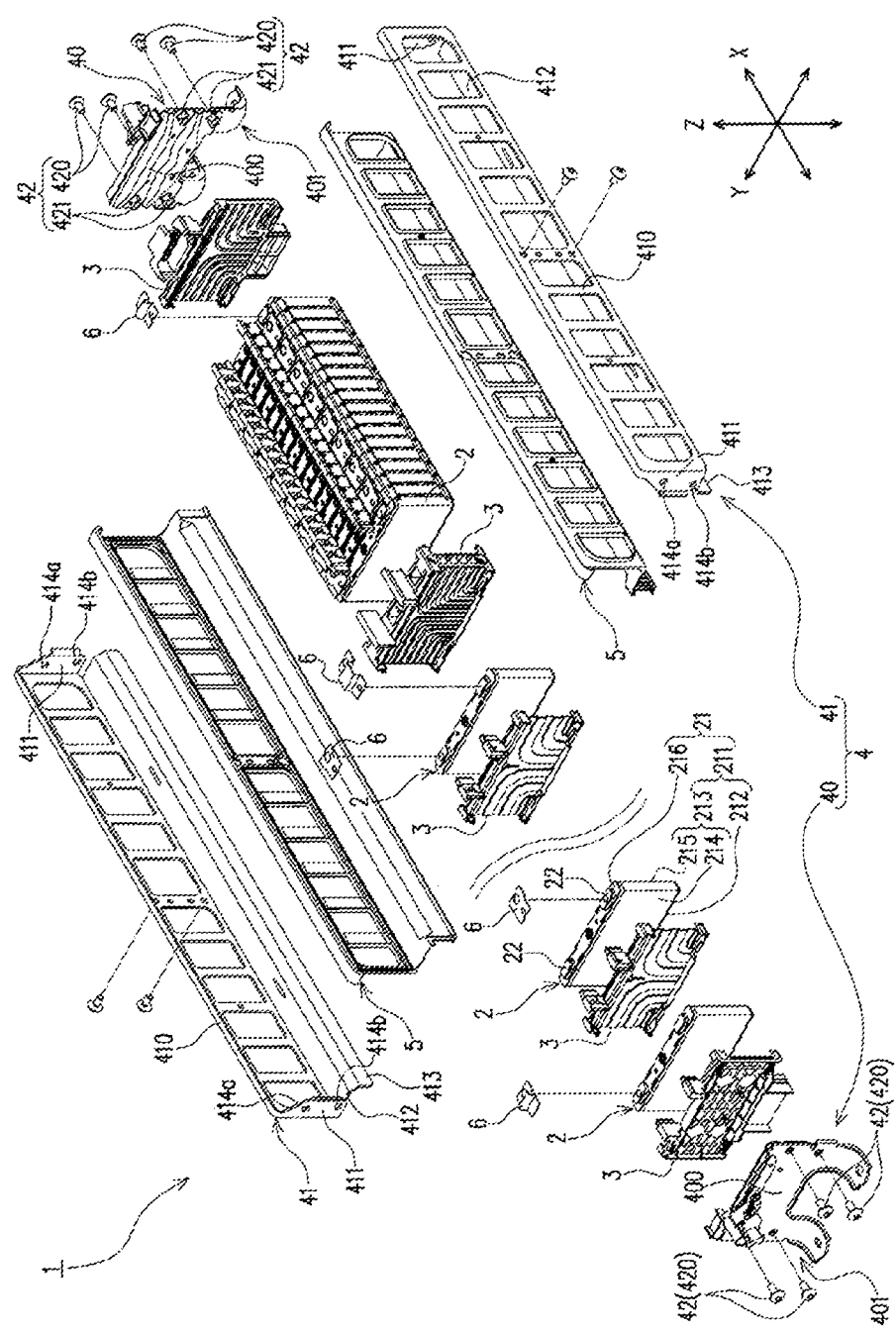
FIG. 2 is an exploded perspective view of the energy storage apparatus.
Figure 3:
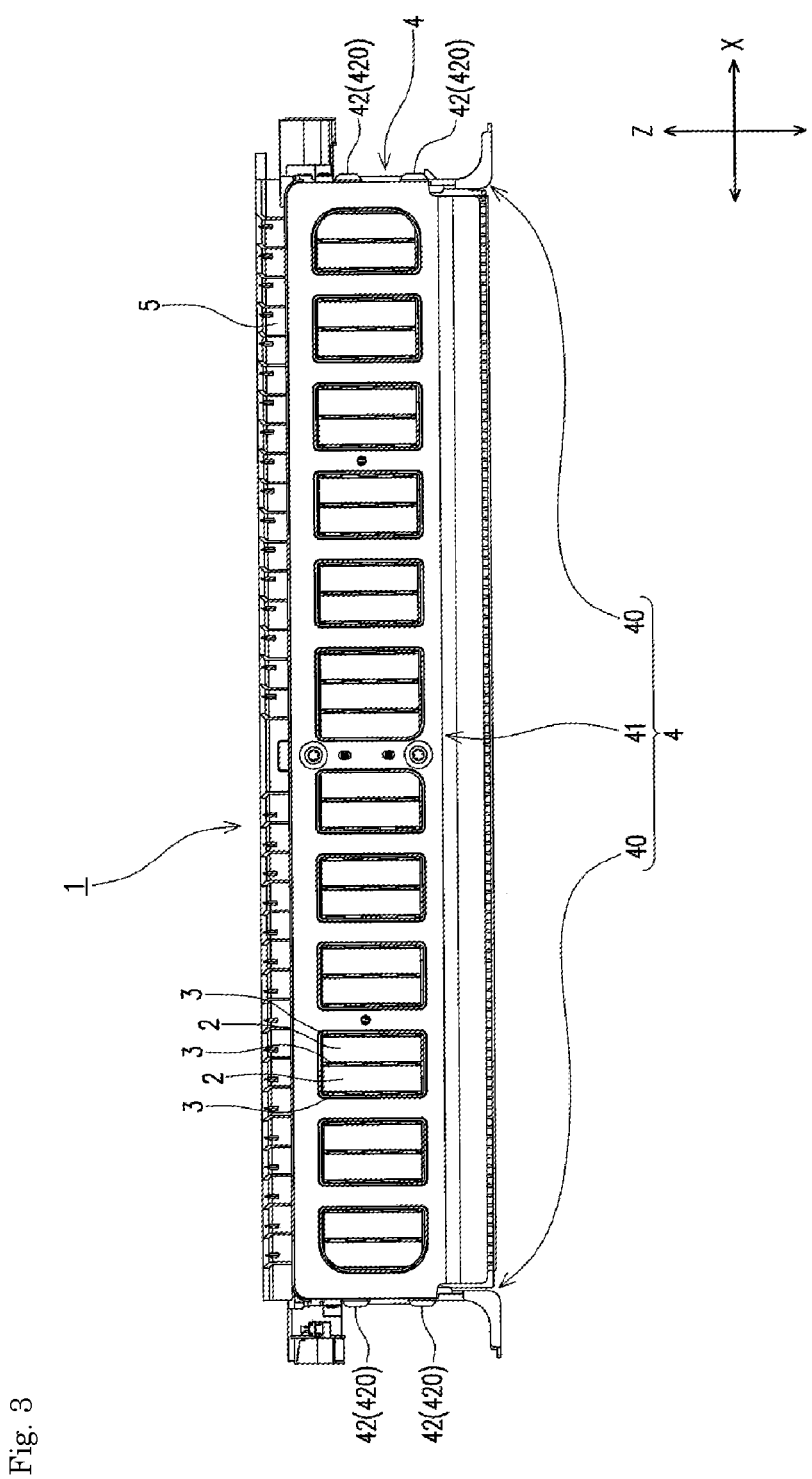
FIG. 3 is a front view of the energy storage apparatus.

As shown in FIGS. 1 to 3, an energy storage apparatus 1 includes at least one energy storage device 2 and a holding member 4 that holds at least one energy storage device 2.

The energy storage apparatus 1 includes an adjacent member 3 adjacent to the energy storage device 2. The energy storage apparatus 1 includes an insulator 5 disposed between at least one energy storage device 2 and the holding member 4, and a bus bar 6 that conductively connects different energy storage devices 2 or the energy storage device 2 and an external input-output terminal (not numbered), or the like (cf. FIGS. 1 and 2).

The energy storage apparatus 1 of the present embodiment includes a plurality of energy storage devices 2. The plurality of energy storage devices 2 are arranged in a first direction. In the following description, the direction in which the plurality of energy storage devices 2 are arranged (first direction) is defined as the X-axis direction, a direction orthogonal to the X-axis direction (second direction) is defined as the Z-axis direction, and a direction orthogonal to the X-axis direction and the Z-axis direction (third direction) is defined as the Y-axis direction. Accordingly, in each of the drawings, Cartesian coordinates corresponding to the X-axis direction, the Y-axis direction, and the Z-axis direction (coordinates in which the X, Y, and Z axes are orthogonal) are illustrated for convenience.

Each of the plurality of energy storage devices 2 is a primary battery, a secondary battery, a capacitor, or the like. The energy storage device 2 of the present embodiment is a nonaqueous electrolyte secondary battery capable of charge-discharge. More specifically, the energy storage device 2 is a lithium ion secondary battery utilizing electron transfer generated in association with the transfer of lithium ions. The energy storage device 2 is a so-called prismatic lithium ion secondary battery.

As shown in FIG. 2, each of the plurality of energy storage devices 2 has an electrode assembly (not shown), a case 21 containing the electrode assembly together with an electrolyte solution, and an external terminal 22 at least a part of which is exposed to the outside of the case 21.

The case 21 has a case body 211 having an opening and a plate-shaped lid plate 216 that fills (closes) the opening of the case body 211. The case body 211 of the present embodiment has a bottomed square cylindrical shape, and the case 21 has a flat rectangular parallelepiped shape. The case body 211 includes a rectangular plate-shaped closing portion 212 and a cylindrical body portion (peripheral wall) 213 connected to the peripheral edge of the closing portion 212. The body portion 213 has a flat rectangular cylindrical shape. The body portion 213 has a pair of long walls 214 extending from the long side at the peripheral edge of the closing portion 212 and a pair of short walls 215 extending from the short side at the peripheral edge of the closing portion 212. The short wall 215 connects corresponding end portions of the pair of long walls 214 to form the flat rectangular cylindrical body portion 213. The lid plate 216 is a rectangular plate-shaped member that blocks the opening of the case body 211. The lid plate 216 is provided with the pair of external terminals 22.

In the energy storage apparatus 1 of the present embodiment, the plurality of energy storage devices 2 are arranged in the X-axis direction as described above. Each of the plurality of energy storage devices 2 has the long wall 214 of the case 21 (case body 211) oriented in the X-axis direction.

The adjacent member 3 is disposed between two energy storage devices 2 disposed in the X-axis direction or between the energy storage device 2 at the most end in the X-axis direction and a member (a part of the holding member 4 in the example of the present embodiment) disposed in the X-axis direction with respect to the energy storage device 2. The adjacent member 3 is made of a member having an insulating property, such as resin. The adjacent member 3 forms a flow channel through which a fluid for temperature adjustment of the energy storage device 2 can flow between the adjacent member 3 and the energy storage device 2.

The holding member 4 is made of a conductive member such as metal. As shown in FIGS. 1 to 3, the holding member 4 surrounds the periphery of the plurality of energy storage devices 2 and the plurality of adjacent members 3, thereby holding the plurality of energy storage devices 2 and the plurality of adjacent members 3 together.

A more specific description will be given. As shown in FIGS. 1 and 2, the holding member 4 is provided with: a first frame 40 including an end member 400 aligned with the energy storage device 2 in the X-axis direction and an attachment portion 401 connected to one end (first end portion) of the end member 400 in the Z-axis direction; a second frame 41 including a body 410 aligned with the energy storage device 2 in the Y-axis direction and an extension 411 extending from the body 410 and extending along at least the outer surface of the end member 400; and a plurality of coupling portions 42 that couple the first frame 40 and the second frame 41 in the X-direction and disposed in the extension 411 at an interval in the Z-axis direction.

In the holding member 4 according to the present embodiment, the first frame 40 includes a pair of first frames 40 disposed on both sides of at least one energy storage device 2 in the X-axis direction, and the second frame 41 includes a pair of second frames 41 disposed on both sides of at least one energy storage device 2 in the Y-axis direction. That is, the holding member 4 has a pair of first frames 40 disposed on both sides of the plurality of energy storage devices 2 in the X-axis direction, and a pair of second frames 41 disposed on both sides of the plurality of energy storage devices 2 in the Y-axis direction and connecting the end portions of the first frames 40 in the Y-axis direction.

Figure 4:
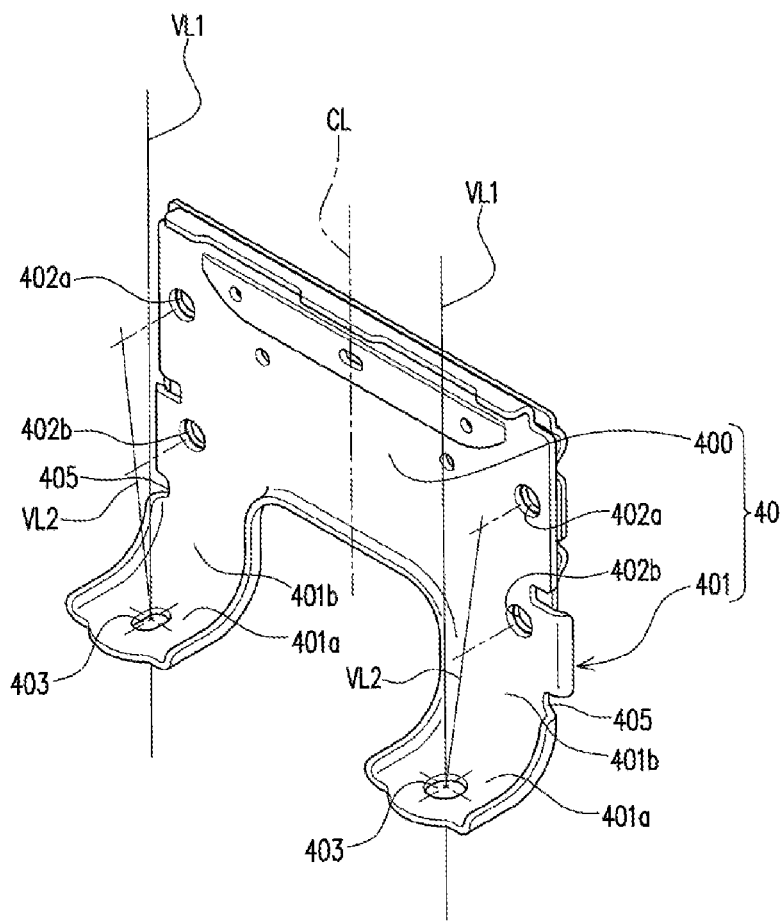
FIG. 4 is a perspective view of a first frame in the energy storage apparatus.

In each of the pair of first frames 40, as shown in FIG. 4, the end member 400 has a first surface facing the energy storage device 2 side in the X-axis direction and a second surface facing the side (outside) opposite to the energy storage device 2 side in the X-axis direction. Note that the end member 400 of the present embodiment is configured by superposing a plurality of members (two members in the present embodiment) in the X-axis direction. Accordingly, the first surface of the end member 400 is the outer surface of one member being at the most end in the X-axis direction, and the second surface of the end member 400 is the outer surface of the other member being at the most end in the X-axis direction.

The end member 400 has holes 402a, 402b penetrating in the X-axis direction at both end portions (respective third ends) in the Y-axis direction. The holes 402a, 402b are inserted with bolts 420 (cf. FIG. 2) constituting the coupling portion 42. In the present embodiment, the two holes 402a, 402b spaced apart in the Z-axis direction are provided at both end portions of the end member 400 in the Y-axis direction.

Of the two holes 402a, 402b spaced apart in the Z-axis direction at both end portions of the end member 400 in the Y-axis direction, the hole 402a being on the other end (second end portion) side of the end member 400 in the Z-axis direction is disposed outward in the Y-axis direction from the hole 402a being on the first end portion side of the end member 400 in the Z-axis direction. In the present embodiment, the holes 402a, 402b at the respective third end portions of the end member 400 in the Y-axis direction are symmetrically disposed with respect to a center line CL extending in the Z-axis direction of the end member 400.

The attachment portion 401 includes an installation portion 401a installed on a fixing surface to which the first frame 40 is fixed. In the present embodiment, the attachment portion 401 includes a pair of legs 401b, 401b disposed at an interval in the Y-axis direction. Each of the pair of legs 401b, 401b extends in the Z-axis direction from the first end portion of the end member 400. Each of the pair of legs 401b, 401b has a first end connected to the first end portion of the end member 400 and a second end on the opposite side of the first end. The first end portion of the leg 401b includes an extending portion extending in the Z-axis direction from the first end portion of the end member 400. The second end of the leg 401b includes the installation portion 401a. The extending portion and the installation portion 401a stand in a row to constitute the leg 401b. Further, a notch 405 is provided at or near the boundary portion in the Z-axis direction between the third end portion of the end member 400 and the outer end portion (fourth end) in the Y-axis direction of the extending portion.

In the present embodiment, the end portion including the second end portion of the leg 401b is bent with respect to the first end side (extension) and constitutes the installation portion 401a having an installation surface directed outward in the Z-axis direction. The installation portion 401a is configured to be installable on the fixing surface (e.g., the outer surface of a mounting bracket fixed to a chassis or chassis of an automobile) to which the first frame 40 is fixed. In the present embodiment, the installation portion 401a is installed on the fixing surface by a bolt having an axial center extending in the Z-axis direction.

Accordingly, the installation portion 401a has a hole 403 into which the shaft portion of the bolt is inserted. The hole 403 penetrates the installation portion 401a in the Z-axis direction. With such a configuration, the center of the hole 403 or the shaft center of the bolt inserted into the hole 403 becomes the fixing center of the installation portion 401a. The fixing center of the installation portion 401a of one leg 401b is disposed on a virtual line passing through the two holes 402a, 402b in one third end portion of the end member 400 in the Y-axis direction as viewed from the X-axis direction. The fixing center of the installation portion 401a of the other leg 401b is disposed on a virtual line passing through the two holes 402a, 402b in the other third end portion of the end member 400 in the Y-axis direction as viewed from the X-axis direction.

That is, the two holes 402a, 402b at one third end portion of the end member 400 in the Y-axis direction are disposed outward in the Y-axis direction from a first imaginary straight line VL1 that passes through the fixing center of the installation portion 401a of one leg 401b being on the one third end side of the end member 400 and extends in the Z-axis direction. The two holes 402a, 402b at the other third end portion of the end member 400 in the Y-axis direction are disposed outward in the Y-axis direction from a first imaginary straight line VL1, which passes through the fixing center of the installation portion 401a of the other leg 401b being on the other third end side of the end member 400 and extends in the Z-axis direction.

Of the two holes 402a, 402b at each third end portion of the end member 400 in the Y-axis direction, the hole 402a other than the hole 402b closest to the installation portion 401a (the other hole) is disposed outward in the Y-axis direction from the hole 402b closest to the installation portion 401a. In the present embodiment, the other hole 402a at each third end portion of the end member 400 in the Y-axis direction is disposed on a second imaginary straight line (imaginary straight line) VL2 passing through the hole 402b closest to the installation portion 401a and the fixing center of the installation portion 401a of the leg 401b corresponding to the third end portion having the hole 402b.

In the present embodiment, the installation portion 401a projects outward from the end member 400 in the X-axis direction, and the fixing center is displaced (is at a different position) with respect to the end member 400 in the X-axis direction. Accordingly, the relationship between the first imaginary straight line VL1 and the second imaginary straight line VL2 defined here (a reference for the placement of the holes 402a, 402b and the fixing center) is a relationship viewed from the X-axis direction (a planar relationship ignoring that the fixing center is at a different position in the X-axis direction with respect to the end member 400).

Referring back to FIG. 2, the pair of first frames 40 sandwich the plurality of energy storage devices 2 with the respective end members 400. The energy storage apparatus 1 of the present embodiment includes the adjacent member 3. Therefore, the energy storage device 2 and the adjacent member 3 are alternately disposed in the X-axis direction. Accordingly, the pair of first frames 40 sandwich the layered product of the energy storage device 2 and the adjacent member 3 in the X-axis direction with the respective end members 400.

In the layered product of the energy storage device 2 and the adjacent member 3, the adjacent member 3 is disposed at each end in the X-axis direction. Thereby, the end member 400 of the first frame 40 is aligned with the energy storage device 2 across the adjacent member 3.

As described above, the pair of second frames 41 are disposed on both sides of the plurality of energy storage devices 2 in the Y-axis direction. Each of the pair of second frames 41 includes the body 410 aligned with the energy storage device 2 in the Y-axis direction, and the extension 411 extending from the body 410 in the Y-axis direction and extending along at least the outer surface of the end member 400. Each of the pair of second frames 41 has a first extension 412 extending in the Y-axis direction from a position different from the extension 411 in the body 410 and extending along the outer surface of the energy storage device 2 (closing portion 212 of the case 21), and a second extension 413 extending outward in the Z-axis direction from the first extension 412. The second frame 41 of the present embodiment is formed by press-molding a metal plate, and the whole (body 410, extension 411, first extension 412, second extension 413) is molded integrally.

In each of the pair of second frames 41, the body 410 is long in the X-axis direction. The body 410 of the present embodiment is in the shape of a ladder.

Each of the pair of second frames 41 has the extensions 411 each at both end portions in the X-axis direction. That is, each second frame 41 has a pair of extensions 411.

The extension 411 is a site coupled to the end portion of the first frame 40 in the Y-axis direction (the third end portion of the end member 400). That is, the extension 411 is a site superposed on the end portion (the third end portion of end member 400) of the first frame 40 in the Y-axis direction from the outside and is coupled to the superposed end member 400 in the X-axis direction.

Accordingly, the extension 411 of the second frame 41 has a plate shape which extends in the Y-axis direction and the Z-axis direction and has a length in the Z-axis direction. The extension 411 has holes 414a, 414b at positions (overlapping positions as viewed from the X-axis direction) corresponding to the holes 402a, 402b provided at the end portion of the first frame 40 (end member 400) in the Y-axis direction.

In the first frame 40 (end member 400) of the present embodiment, the two holes 402a, 402b are provided at each third end portions in the Y-axis direction at an interval in the Z-axis direction, and hence the two holes 414a, 414b spaced apart in the Z-axis direction are also provided in the extension 411.

The positions of the two holes 414a, 414b of the extension 411 are also different in the Y-axis direction. In other words, one hole 414a of the two holes 414a, 414b of the extension 411 (the hole 414a located on the upper side when the Z-axis direction is the vertical direction) is located outward in the Y-axis direction than the other hole 414b of the two holes 414a, 414b of the extension 411 (the hole 414b located on the lower side when the Z-axis direction is the vertical direction.).

In the present embodiment, the coupling portion 42 is made up of the bolt 420 having a shaft-shaped male thread (not numbered) and a nut 421 having a female thread (threaded hole) that is threaded to the male thread of the bolt 420. In the present embodiment, the nut 421 of the coupling portion 42 is fixed (welded in the present embodiment) to the first surface of the end member 400 with its female thread (threaded hole) aligned with each of the holes 402a, 402b of the first frame 40 (end member 400).

In the energy storage apparatus 1 of the present embodiment, the male thread of the bolt 420 constituting the coupling portion 42 is inserted into each of the holes 414a, 414b of the extension 411 in the second frame 41 and each of the holes 402a, 402b of the third end portion of the end member 400 in the first frame 40, on which the extension 411 is superposed, and then the male thread is threaded into the nut 421 (female thread). Thereby, the coupling portion 42 (the bolt 420 and the nut 421) couples the end member 400 and the extension 411 in the X-axis direction. That is, each coupling portion 42 serves as a point of force for transmitting a force in the X-axis direction to the end member 400 and the extension 411.

Figure 5:
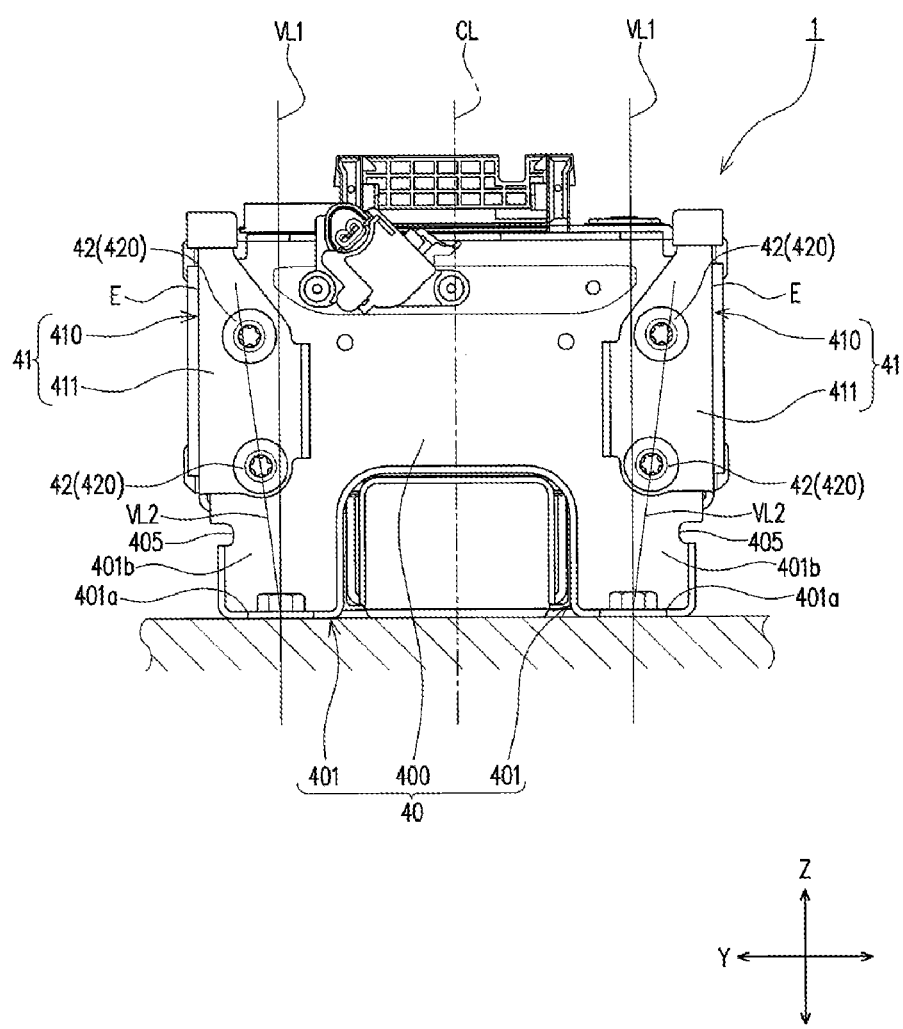
FIG. 5 is a side view of a state in which the energy storage apparatus is fixed to a fixing surface being a mounting target.

Since the bolts 420 are inserted into the holes 402a, 402b of the end member 400 and the holes 414a, 414b of the extension 411 in this manner, the two coupling portions 42 being in the extension 411 superposed on the third end portion of the end member 400 are disposed corresponding to the placement of the holes 402a, 402b of the end member 400. That is, as shown in FIG. 5, the two coupling portions 42 are disposed outward in the Y-axis direction from the first imaginary straight line VL1 that passes through the fixing center of the installation portion 401a and extends in the Z-axis direction.

In the present embodiment, of the two coupling portions 42 in the extension 411, the coupling portion 42 other than the coupling portion 42 closest to the installation portion 401a (the other coupling portion) is disposed outward in the Y-axis direction from the coupling portion 42 closest to the installation portion 401a. The other coupling portion 42 of the present embodiment is disposed on the second imaginary straight line VL2 passing through the coupling portion 42 closest to the installation portion 401a and the fixing center of the installation portion 401a.

As described above, the installation portion 401a projects outward from the end member 400 in the X-axis direction, and the fixing center of the installation portion 401a is different in position from the end member 400 (coupling portion 42) in the X-axis direction. Accordingly, the relationship between the first imaginary straight line VL1 and the second imaginary straight line VL2 defined here (a reference for the placement of the coupling portion 42 and the fixing center) is a relationship viewed from the X-axis direction (a planar relationship ignoring that the fixing center is at a different position in the X-axis direction with respect to the end member 400), as apparent from FIG. 5. The term "disposed on the second imaginary line VL2" used here naturally includes that, on the assumption of the state viewed from the X-axis direction, not only that the center of the coupling portion 42 (the shaft center of the male thread of the bolt 420 in the present embodiment) is located on the second imaginary straight line VL2, but also that the second imaginary straight line VL2 passes through any position in the area where the force in the X-axis direction of the coupling portion 42 is transmitted to the extension 411 (the head of the bolt 420 and the area where the nut is present in the present embodiment).

Figure 7:
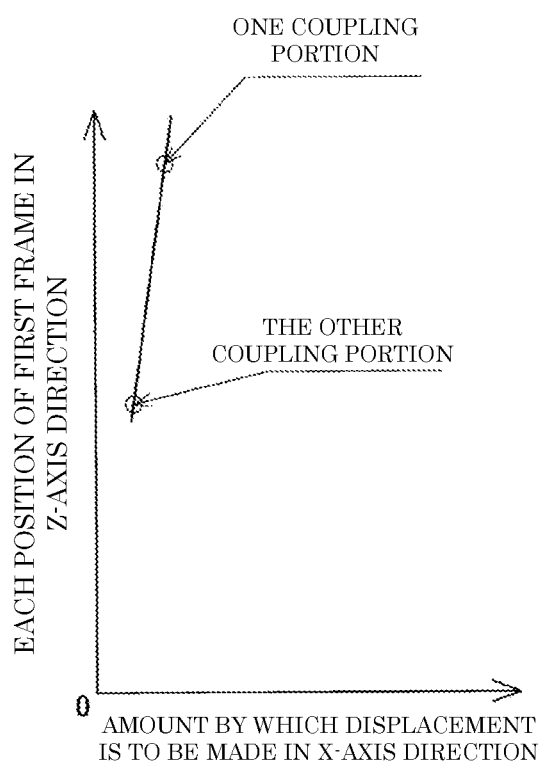
FIG. 7 is a graph schematically showing the relationship between each position in a second direction (Z-axis direction) of the first frame and an amount by which each position in the second direction (Z-axis direction) are to be displaced in a first direction (X-axis direction).

Here, it is preferable that the coupling portion 42 closest to the installation portion 401a of the two coupling portions 42 be disposed such that the inclination of the second imaginary straight line VL2 is an inclination approximate to, or an inclination the same as, an inclination representing a change in the amount of displacement in the X-axis direction at each position (position along the Z-axis direction) of the first frame 40 to be inclined in accordance with the energization of the energy storage device 2 (cf. FIG. 7). That is, it is preferable that the coupling portion 42 closest to the installation portion 401a be disposed such that the inclination of the second imaginary straight line VL2 is an inclination approximate to, or an inclination the same as, an inclination representing a change in the force in the X-axis direction acting at each position (position along the Z-axis direction) of the first frame 40 to be inclined with the energization of the energy storage device 2 (cf. FIG. 8).

In the present embodiment, a plurality of coupling portions 42 for coupling one second frame 41 of the pair of second frames 41 and the first frame 40, and a plurality of coupling portions 42 for coupling the other second frame 41 and the first frame 40 are symmetrically disposed with respect to the center line CL extending in the Z-axis direction of the end member 400 of the first frame 40.

Returning to FIG. 2, the insulator 5 has an insulating property and is disposed between the second frame 41 and the plurality of energy storage devices 2. The insulator 5 covers an area of the second frame 41 facing at least the plurality of energy storage devices 2. Specifically, the insulator 5 of the present embodiment covers at least the surface of the body 410 facing each energy storage device 2, the surface of the first extension 412 facing each energy storage device 2, and the surface of the second extension 413 facing the inside in the Y-axis direction. Thereby, the insulator 5 insulates between the second frame 41 and the plurality of energy storage devices 2.

The bus bar 6 is a plate-shaped member having conductivity, such as metal. The bus bar 6 conducts the external terminals 22 of the energy storage device 2 to each other or conducts the external terminal 22 of the energy storage device 2 to the external input-output terminal (not numbered). The energy storage apparatus 1 is provided with a plurality of bus bars 6 (the plurality being the number corresponding to the number of the plurality of energy storage devices 2 and the number of external input-output terminals). The plurality of bus bars 6 of the present embodiment connect all of the plurality of energy storage devices 2 included in the energy storage apparatus 1 in series (conduct).

As described above, the energy storage apparatus 1 of the present embodiment includes at least one energy storage device 2 and the holding member 4 that holds the energy storage device 2. The holding member 4 is provided with: the first frame 40 including the end member 400 aligned with the energy storage device 2 in the X-axis direction and the attachment portion 401 connected to the first end portion of the end member 400 in the Z-axis direction; the second frame 41 including the body 410 aligned with the energy storage device 2 in the Y-axis direction and the extension 411 extending from the body 410 and extending along at least the outer surface of the end member 400; and the plurality of coupling portions 42 that couple the first frame 40 and the second frame 41 in the X-direction and disposed in the extension 411 at an interval in the Z-axis direction. The attachment portion 401 includes the installation portion 401a installed on the fixing surface to which the first frame 40 is fixed. The plurality of coupling portions 42 are disposed outward in the Y-axis direction from the first imaginary straight line VL1 that passes through the fixing center of the installation portion 401a and extends in the Z-axis direction. The plurality of coupling portions 42 include the coupling portion 42 closest to the installation portion 401a in the X-axis direction of the first frame 40 and the other coupling portion 42. The other coupling portion 42 is further apart in the Y-axis direction from the center line extending in the Z-axis direction of the end member 400 than the coupling portion 42 closest to the installation portion 401a. That is, the other coupling portion 42 is disposed outward in the Y-axis direction from the coupling portion 42 closest to the installation portion 401a.

Figure 6:
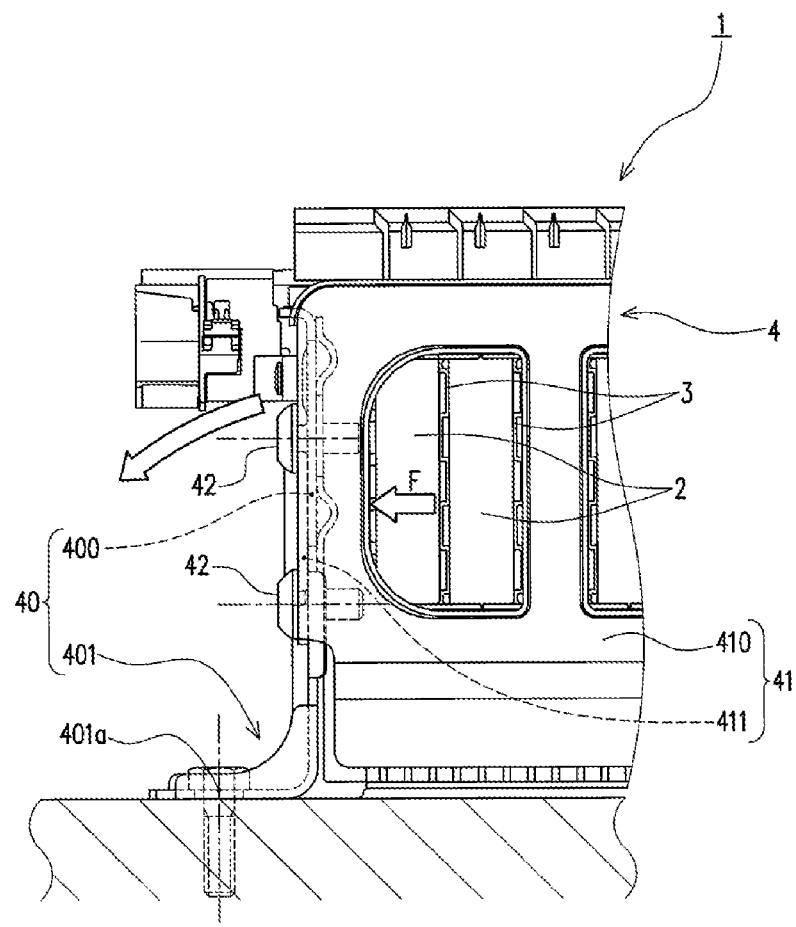
FIG. 6 is a partial front view of a state in which the energy storage apparatus is fixed to the fixing surface being the mounting target.
Figure 8:
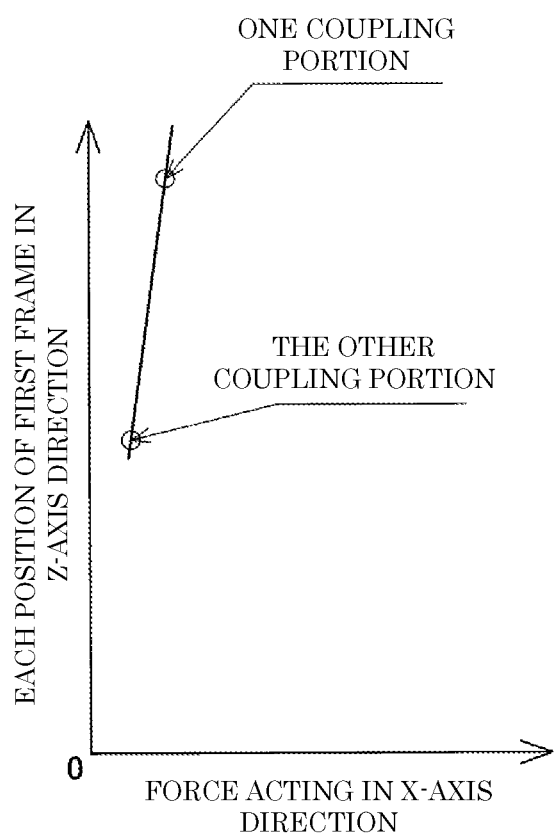
FIG. 8 is a graph schematically showing the relationship between each position in the second direction (Z-axis direction) of the first frame and a force in the first direction (X-axis direction) acting on each position in the second direction (Z-axis direction).

With the above configuration, as shown in FIG. 6, when the energy storage device 2 energizes the end member 400 of the first frame 40 in the X-axis direction due to an external factor such as vibration, the expansion of the energy storage device 2 during charge, or the like, the first frame 40 is to fall outward with the installation portion 401a as a fulcrum by the action of an energizing force F of the energy storage device 2. Then, as shown in FIG. 7, the amount of the displacement in the X-axis direction on the side (the second end portion of the end member 400) opposite to the installation portion 401a side of the first frame 40 in the Z-axis direction is proportionally larger than the amount of displacement in the X-axis direction on the installation portion 401a side of the first frame 40. Accordingly, as shown in FIG. 8, the force acting in the X-axis direction is larger at a position with a longer distance from the installation portion 401a serving as a tilting fulcrum. That is, the force in the X-axis direction increases proportionally from the installation portion 401a toward the second end portion of the end member 400.

However, with the above configuration, since the plurality of coupling portions 42 are disposed outward in the Y-axis direction from the first imaginary straight line VL1 as shown in FIG. 5, each coupling portion 42 for transmitting the force in the X-axis direction is located near a boundary E between the extension 411 and the body 410. This reduces the value of the bending moment of the boundary E between the extension 411 and the body 410.

In addition, since the other coupling portion 42 is disposed outward in the Y-axis direction from the coupling portion 42 closest to the installation portion 401a, the values of the bending moments caused by the forces acting on the peripheries of the respective coupling portions 42 (the bending moments of the connection parts between the body 410 and the extension 411) come close to each other, and consequently, the values of the bending stresses also come close to each other.

Specifically, as the first frame 40 is energized by the energy storage device 2, the second end portion side of the end member 400 tends to tilt more than the first end side. Therefore, a force larger than a force acting on the other coupling portion 42 being on the installation portion 401a side acts on one coupling portion 42 on the second end portion side of the end member 400 (cf. FIG. 8). In contrast, the distance from the one coupling portion 42 to the boundary E between the body 410 and the extension 411 is shorter than the distance from the other coupling portion 42 to the boundary E between the body 410 and the extension 411 (cf. FIG. 5). The bending moment is obtained from the product of the force and the distance, so that the bending moments caused by the forces acting on the peripheries of the respective coupling portions 42 (the bending moments of the connection parts between the body 410 and the extension 411) numerically come close, and consequently, the bending stresses also numerically come close. It is thus possible to prevent the occurrence of local stress concentration around the boundary portion between the first frame 40 and the second frame 41, which are aligned with the energy storage device 2 in different directions and coupled to each other via the coupling portion 42.

In particular, in the energy storage apparatus 1 of the present embodiment, the other coupling portion 42 (the coupling portions 42 other than the coupling portion 42 closest to the installation portion 401a of the plurality of coupling portions 42) is disposed on the second imaginary straight line VL2 passing through the coupling portion 42 closest to the installation portion 401a and the fixing center of the installation portion 401a.

With this configuration, since the second imaginary straight line VL2 is a straight line passing through the fixing center of the installation portion 401a and the coupling portion 42 disposed outward from the first imaginary straight line VL1, as shown in FIG. 5, the second imaginary straight line VL2 is spaced apart from the first imaginary straight line VL1 in a proportional manner as getting more distant from the fixing center of the installation portion 401a in the Z-axis direction. That is, the second imaginary straight line VL2 is inclined with respect to the first imaginary straight line VL1 and approaches the boundary E between the body 410 and the extension 411 in a proportional manner.

Therefore, the distance from each of the plurality of coupling portions 42 disposed on the second imaginary straight line VL2 to the boundary E between the body 410 and the extension 411 is a distance corresponding to each position of the plurality of coupling portions 42 in the Z-axis direction. That is, the coupling portion 42 being at a position farther from the installation position of the installation portion 401a in the Z-axis direction proportionally has a shorter distance to the boundary E between the body 410 and the extension 411.

In contrast, as shown in FIG. 8, the force in the X-axis direction acting with the tilting of the first frame 40 is proportionally larger at a position farther from the installation position of the installation portion 401a in the Z-axis direction.

Therefore, in the energy storage apparatus 1 of the above configuration, as a result of obtaining a balance between the forces in the X-axis direction acting on the respective coupling portions 42 and the distances from the respective coupling portions 42 to the boundary E between the body 410 and the extension 411, the bending moments at the positions corresponding to the respective coupling portions 42 at the boundary E between the body 410 and the extension 411 come close or become uniform. Thereby, the bending stresses at the positions corresponding to the respective coupling portions 42 also come close or become uniform.

In the energy storage apparatus 1 of the present embodiment, the first frame 40 includes the pair of first frames 40 disposed on both sides of at least one energy storage device 2 in the X-axis direction, and the second frame 41 includes the pair of second frames 41 disposed on both sides of at least one energy storage device 2 in the Y-axis direction. The plurality of coupling portions 42 for coupling one second frame 41 of the pair of second frames 41 and the first frame 40, and the plurality of coupling portions 42 for coupling the other second frame 41 and the first frame 40 are symmetrically disposed with respect to the center line CL extending in the Z-axis direction of the end member 400 of the first frame 40.

With the above configuration, the energizing force F of the energy storage device 2 acting on the end member 400 of the first frame 40 acts equally or substantially equally on one second frame 41 side and the other second frame 41 side. This makes uniform the bending moment (bending stress) around the boundary E between the first frame 40 and the one second frame 41 and the bending moment (bending stress) around the boundary E between the first frame 40 and the other second frame 41. Therefore, the concentration of a stress on the periphery of any of the coupling portions 42 coupling the first frame 40 and the second frame 41 is prevented.

Further, in the energy storage apparatus 1 of the present embodiment, the attachment portion 401 includes the pair of legs 401b disposed at an interval in the Y-axis direction and each extending in the Z-axis direction from the first end portion of the end member 400. Each of the pair of legs 401b has the first end connected to the first end portion of the end member 400 and including the extending portion extending in the Z-axis direction from the first end portion of the end member 400, and the second end opposite to the first end and including the installation portion 401a.

In this way, the end member 400 is disposed at a position apart from the fixing surface in the Z-axis direction by the pair of legs 401b, so that the energy storage devices 2 arranged in the X-axis direction with respect to the end members 400 are also disposed at positions apart from the fixing surface in the Z-axis direction. This improves the heat dissipation of the energy storage device 2.

As described above, when the energizing force F by the energy storage device 2 acts on the end member 400 at a position apart from the fixing surface due to the presence of the legs 401b, tilting occurs in accordance with the length of each of the legs. Hence, variations in stress (bending moment) tend to occur in each of the plurality of coupling portions 42.

However, according to the present embodiment, as described above, as a result of obtaining a balance between the forces in the X-axis direction acting on the respective coupling portions 42 and the distances from the respective coupling portions 42 to the boundary E between the body 410 and the extension 411, the bending moments at the positions corresponding to the respective coupling portions 42 at the boundary E come close or become uniform. Therefore, even when the first frame 40 has the legs 401b for disposing the end member 400 at a position apart from the fixing surface, the values of the bending stresses at the positions corresponding to the respective plurality of coupling portions 42 come close or become uniform.

Therefore, according to the energy storage apparatus 1 of the present embodiment, it is possible to achieve an excellent effect of being able to prevent the occurrence of local stress concentration around the boundary E between the first frame 40 and the second frame 41, which are aligned with the energy storage device 2 in different directions and are coupled to each other via the coupling portion 42.

It is natural that the energy storage apparatus of the present invention is not limited to the above embodiment, and various modifications may be made within the scope of the present invention. For example, to the configuration of a certain embodiment, the configuration of another embodiment can be added, and a part of the configuration of a certain embodiment can be replaced with the configuration of another embodiment. Further, a part of the configuration of a certain embodiment can be eliminated.

In the energy storage apparatus 1 of the above embodiment, the coupling portion 42 for coupling the first frame 40 and the second frame 41 has been made up of the bolt 420 and the nut 421, but the present invention is not limited thereto. For example, the coupling portion 42 may be a fastening member such as a rivet. The coupling portion 42 may be a welded portion formed by welding the end member 400 and the extension 411. In these cases, when the coupling portion 42 is formed of the fastening member such as a rivet, the area for transmitting the force in the X-axis direction is an area in which the head of the fastening member and a caulking (deformation enlarged portion) exist. When the coupling portion 42 is formed of the welded portion, the area for transmitting the force in the X-axis direction is a welded area in which the end member 400 and the extension 411 are connected physically. Therefore, when the coupling portion 42 is disposed on the second imaginary straight line VL2, the second imaginary straight line VL2 may pass through the area in which the head of the fastening member and the like exist or the welding area.

In the energy storage apparatus 1 of the above embodiment, the nut 421 constituting the coupling portion 42 has been welded to the first frame 40, but the present invention is not limited thereto. For example, the nut 421 constituting the coupling portion 42 may be independent of the end member 400 of the first frame 40.

The first frame 40 (end member 400) of the above embodiment has a stacked structure in which a plurality of members are superposed, but the present invention is not limited thereto. The first frame 40 (end member 400) may have a single-layer structure. That is, the first frame 40 may be integrally molded similarly to the second frame 41.

In the energy storage apparatus 1 of the above embodiment, the two coupling portions 42 have been provided at the third end portion of the end member 400, but the present invention is not limited thereto. For example, the third end portion of the end member 400 may be provided with three or more coupling portions 42. In this case as well, in the three or more coupling portions 42, the other coupling portions 42 (of the three or more coupling portions 42, the remaining coupling portions 42 excluding the coupling portion 42 closest to the installation portion 401*a*) may be further apart in the Y-axis direction from the center line CL, extending in the Z-axis direction of the end member 400, than the coupling portion 42 closest to the installation portion 401*a*. Note that three or more coupling portions 42 may be disposed outward from the first imaginary straight line VL1 in the Y-axis direction, and the other coupling portions 42 may be disposed outward in the Y-axis direction from the coupling portion 42 closest to the installation portion 401*a*.

Figure 9:
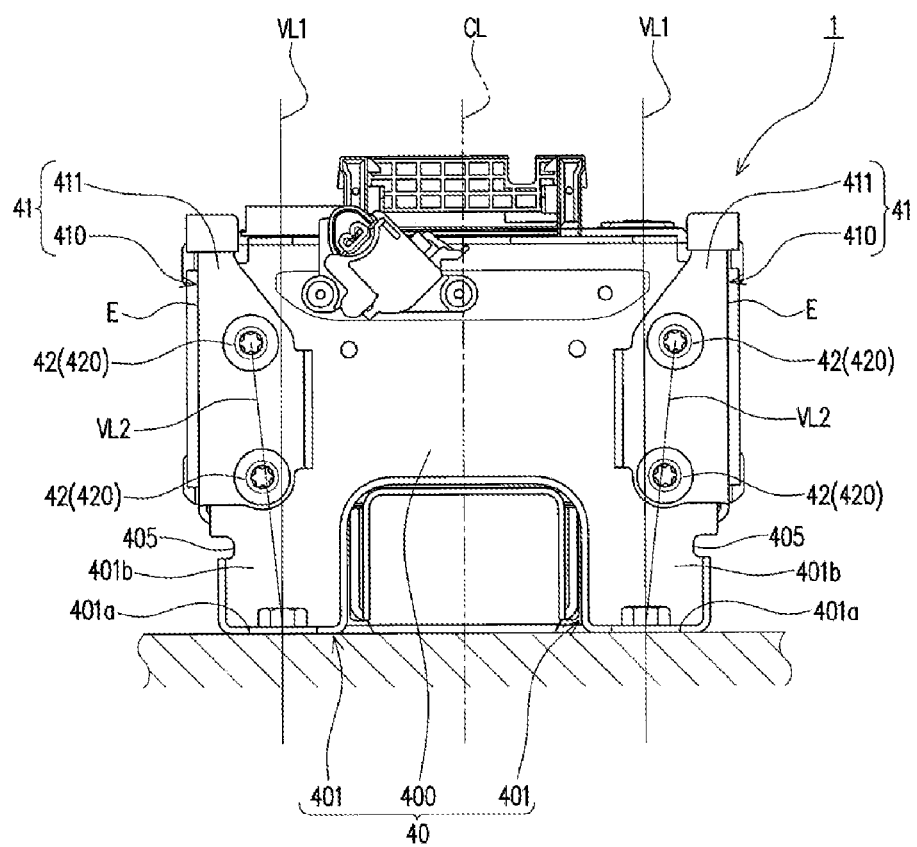
FIG. 9 is a side view of a state in which an energy storage apparatus according to another embodiment is fixed to a fixing surface being a fixing target.

In the energy storage apparatus 1 of the above embodiment, the other coupling portion 42 has been disposed on the second imaginary straight line VL2 passing through the coupling portion 42 closest to the installation portion 401*a* and the fixing center of the installation portion 401*a*, but the present invention is not limited thereto. For example, as shown in FIG. 9, the coupling portions (the other coupling portions) 42 other than the coupling portion 42 farthest from the installation portion 401*a* of the plurality of coupling portions 42 may be disposed on the second imaginary straight line (imaginary straight line) VL2 passing through the coupling portion 42 farthest from the installation portion 401*a* and the fixing center of the installation portion 401*a*. In this way, the same operation and effect as in the above embodiment can be obtained.

Specifically, since the second imaginary straight line VL2 is a straight line passing through the fixing center of the installation portion 401*a* and the coupling portion 42 disposed outward from the first imaginary straight line VL1, the second imaginary straight line VL2 is spaced apart from the first imaginary straight line VL1 in a proportional manner as getting more distant from the fixing center of the installation portion 401*a* in the Z-axis direction. That is, the second imaginary straight line VL2 is inclined with respect to the first imaginary straight line VL1 and approaches the boundary E between the body 410 and the extension 411 in a proportional manner.

Therefore, the distance from each of the plurality of coupling portions 42 disposed on the second imaginary straight line VL2 to the boundary E between the body 410 and the extension 411 is a distance corresponding to each position of the plurality of coupling portions 42 in the Z-axis direction. That is, the coupling portion 42 being at a position farther from the installation position of the installation portion 401*a* in the Z-axis direction proportionally has a shorter distance to the boundary E.

In contrast, the force in the X-axis direction acting with the tilting of the first frame 40 is proportionally larger at a position farther from the installation position of the installation portion 401*a* in the Z-axis direction.

Therefore, in the energy storage apparatus 1 of the above configuration, as a result of obtaining a balance between the forces in the X-axis direction acting on the respective coupling portions 42 and the distances from the respective coupling portions 42 to the boundary E in the Y-axis direction, the bending moments at the positions corresponding to the respective coupling portions 42 at the boundary E come close or become uniform. Thereby, the bending stresses at the positions corresponding to the respective coupling portions 42 also come close or become uniform.

In this case, it is preferable that the coupling portion 42, which is farthest from the installation portion 401*a* (in other words, on the second end portion side of the end member 400), of the plurality of coupling portions 42 be disposed such that the inclination of the second imaginary straight line VL2 is an inclination approximate to, or an inclination the same as, an inclination representing a change in the amount of displacement in the X-axis direction at each position (position along the Z-axis direction) of the first frame 40. That is, it is preferable that the coupling portion 42 farthest from the installation portion 401*a* be disposed such that the inclination of the second imaginary straight line VL2 is an inclination approximate to, or an inclination the same as, an inclination representing a change in the force in the X-axis direction acting at each position (each position along the Z-axis direction) of the first frame 40 to be inclined with the energization of the energy storage device 2. In this case as well, the relationship between the first imaginary straight line VL1 and the second imaginary straight line VL2 (a reference for the placement of the coupling portion 42 and the fixing center of the installation portion 401*a*) is a relationship viewed from the X-axis direction (a planar relationship ignoring that the fixing center is at a different position in the X-axis direction with respect to the end member 400), as apparent from FIG. 9.

In the above embodiment, the coupling portion 42 has been disposed on the second imaginary straight line VL2, but the present invention is not limited thereto. For example, the plurality of coupling portions 42 may be disposed at positions deviated from the second imaginary straight line VL2. In this case, it is preferable that the other coupling portion 42 be disposed outward in the Y-axis direction from the coupling portion 42 closest to the installation portion 401*a*.

In the above embodiment, the energy storage apparatus 1 has included the plurality of energy storage devices 2, but the present invention is not limited thereto. For example, the energy storage apparatus 1 may include one energy storage device 2. That is, the energy storage apparatus 1 only needs to include at least one energy storage device 2.

Figure 10:
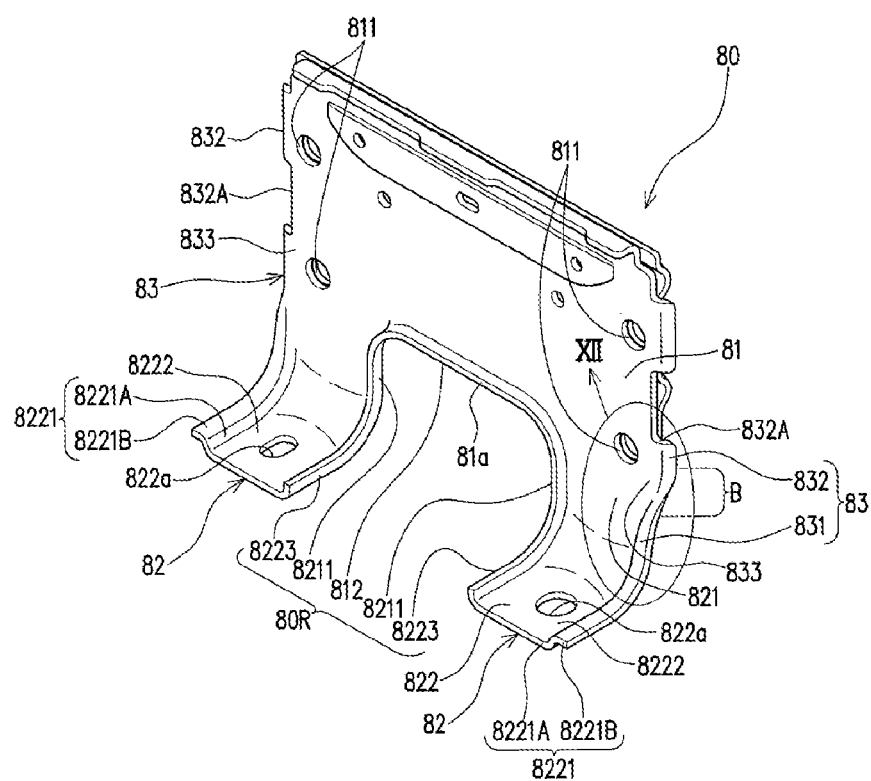
FIG. 10 is a perspective view of a first frame according to another embodiment.
Figure 11:
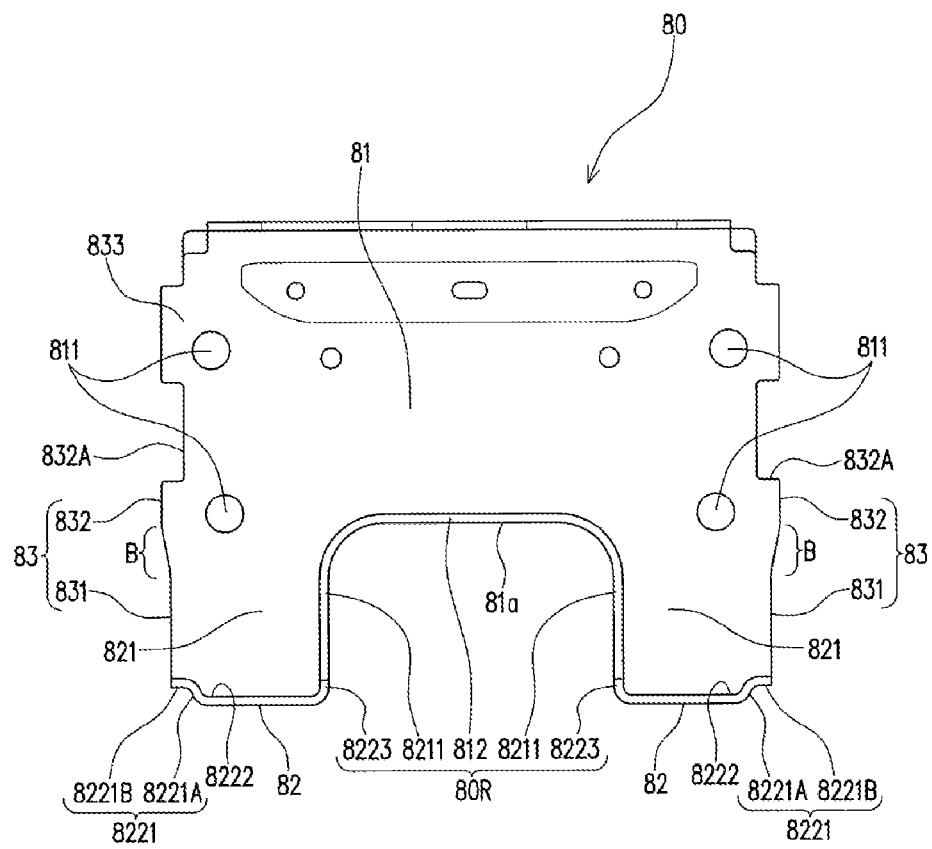
FIG. 11 is a view of the first frame in a first-direction (X-axis direction) view.
Figure 11:
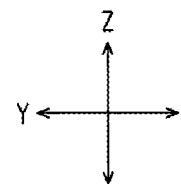

Further, in the first frame 40 of the energy storage apparatus 1 of the above embodiment, the notch 405 is provided at or near the boundary portion in the Z-axis direction between the end portion (third end portion) of the end member 400 in the Y-axis direction and the outer end portion (fourth end portion) in the Y-axis direction of the extending portion (the site except for the installation portion 401*a*) of each leg 401*b*, but the configuration is not limited thereto. For example, as shown in FIGS. 10 and 11, the boundary portion in the Z-axis direction between a third end portion of an end member 81 and a fourth end portion of an extending portion 821 of a leg 82 or its vicinity may be continuous. The details are as follows. The energy storage apparatus including a first frame 80 described below has the same configuration as that of the energy storage apparatus 1 of the above embodiment except for the configuration of the first frame. Therefore, in the following description, the same reference numerals will be used for the configurations other than the first frame 80 as those in the energy storage apparatus 1 of the above embodiment.

As shown in FIGS. 10 and 11, each first frame 80 has the end member 81 extending along a plane (a plane containing the Y axis and the Z axis: Y-Z plane) direction orthogonal to the X-axis direction, and the leg 82 that is connected to a first end portion 812, which is an end portion of the end member 81 on one side (lower side in FIG. 10) in the Z-axis direction, and can be fixed to the fixing surface.

The end member 81 is a rectangular site corresponding to the energy storage device 2 as viewed in the X-axis direction and has a hole 811 penetrating in the X-axis direction at each end portion (each third end portion) in the Y-axis direction. Into this hole 811, the coupling portion 42 (more specifically, the bolt 420) for coupling the first frame 80 and the second frame 41 is inserted. In the end member 81 of the present embodiment, two holes 811 spaced apart in the Z-axis direction are disposed each at the third end portion on one side and the third end portion on the other side in the Y-axis direction.

In the end member 81 of the present embodiment, on the surface on the energy storage device 2 side, the nut 421 constituting the coupling portion 42 for coupling the first frame 80 and the second frame 41 is disposed. The nut 421 is welded to the end member 81 at a position corresponding to the hole 811.

The leg 82 has the extending portion 821 extending in the Z-axis direction from the first end portion 812 of the end member 81 in the Z-axis direction, and a plate-shaped installation portion 822 extending along the X-axis direction from the tip of the extending portion 821 and extending along the X-Y plane (the plane containing the X axis and the Y axis).

The extending portion 821 is a site of the rectangular end member 81 extending from a side 81*a* corresponding to the closing portion 212 of the energy storage device 2. The first frame 80 of the present embodiment has a pair of extending portions 821 disposed at intervals in the Y-axis direction. Each of the pair of extending portions 821 extends from each end portion in the Y-axis direction of the first end portion 812 of the end member 81 to one side in the Z-axis direction. Each of the pair of extensions 821 of the present embodiment has a plate shape along the Y-Z plane.

Each of side end portions (third end portion and fourth end portion) 83, which is an end portion in the Y-axis direction in the end member 81 and the extending portion 821 (the site of the first frame 80 excluding the installation portion 822), is bent at the end member 81 and the extending portion 821 with respect to a site (adjacent site) 833 adjacent to the side end portions 83 in the Y-axis direction. In the end member 81 and the extending portion 821 of the present embodiment, each of the side end portions 83 on both sides in the Y-axis direction is bent with respect to the adjacent site 833. Each of the two side end portions 83 has a first site 831 including an end portion on one side (an end portion on the installation portion 822 side) in the Z-axis direction at the side end portion 83 and a second site 832 adjacent to the first site 831 in the Z-axis direction.

The first site 831 and the second site 832 at each side end portion 83 are bent toward the sides opposite to each other with respect to the adjacent site 833. Specifically, the first site 831 has, in order from the adjacent site 833 toward the outside in the Y-axis direction, a first rib 831A that bends outward in the X-axis direction (the opposite side of the energy storage device 2) with respect to the adjacent site 833, and a second rib 431B that bends outward in the Y-axis direction with respect to the first rib 431A (cf. FIGS. 12 and 13). The second site 832 is bent inward in the X-axis direction (to the energy storage device 2 side) with respect to the adjacent site 833. In the second site 832 of the present embodiment, a notch 832A is formed at the center in the Z-axis direction. The notch 832A is located between two holes 811 disposed at an interval in the Z-axis direction.

At the side end portion 83, the first site 831 and the second site 832 are continuous and bent toward the sides opposite to each other (to one side and the other side in the X-axis direction) with respect to the adjacent site 833. Therefore, a boundary portion B between the first site 831 and the second site 832 is twisted (the orientation changes continuously: cf. FIGS. 10 and 12). The boundary portion B (the torsion at the side end portion 83 caused by the first site 831 and the second site 832 bending to the sides opposite to each other with respect to the adjacent site 833) is formed on one side (lower side in FIG. 10) of the center positions of the end member 81 and the extending portion 821 in the Z-axis direction, more specifically, on the extending portion 821.

In the first frame 80 of the present embodiment, the first end portion 812 of the end member 81 and an inner end portion 8211 in the Y-axis direction of each of the pair of extending portions 821 are bent outward in the X-axis direction.

The installation portion 822 is used to install the energy storage apparatus 1 on a fixing surface (fixing object). The installation portion 822 of the present embodiment extends outward in the X-axis direction from the tip of each of the pair of extending portions 821 (in the direction in which the installation portion 822 separates from the energy storage device 2). Each installation portion 822 has a hole 822a penetrating in the Z-axis direction. With a bolt, for example, inserted in the hole 822a, the bolt is screwed into a threaded hole provided in the fixing surface and tightened, whereby the energy storage apparatus is fixed to the fixing surface.

An outer end portion (fifth end portion) 8221 in the Y-axis direction in the installation portion 822 described above is bent in the installation portion 822 with respect to a site (adjacent site) 8222 adjacent to the fifth end portion 8221 in the Y-axis direction. The fifth end portion 8221 of the present embodiment is continuous with the first site 831 and bent toward the side where the first site 831 is located with respect to the adjacent site 8222 (in the example of the present embodiment, the other side in the Z-axis direction: the upper side in FIG. 10).

Here, "the fifth end portion 8221 is bent toward the side where the first site 831 is located with respect to the adjacent site 8222" means that when the extending portion 821 and the installation portion 822 are extended so as to be straight along the Z-axis direction (i.e., when the direction in which the edge in the Y-axis direction of the adjacent site 833 in the end member 81 and the extension 821 extends is matched with the direction in which the edge in the Y-axis direction of the adjacent site 8222 in the installation portion 822 extends), the fifth end portion 8221 is bent toward (located in) the side where the first site 831 is bent with respect to the adjacent sites 833, 8222 (where the first site 831 is located).

Figure 12:
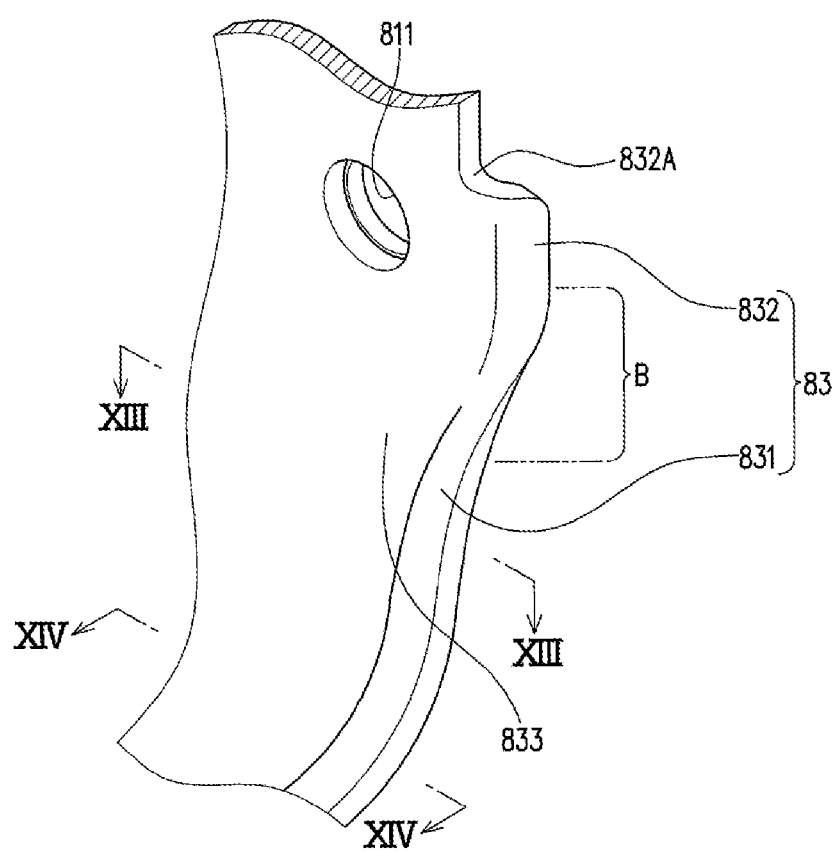
FIG. 12 is an enlarged perspective view of a position XII shown in FIG. 10.
Figure 13:
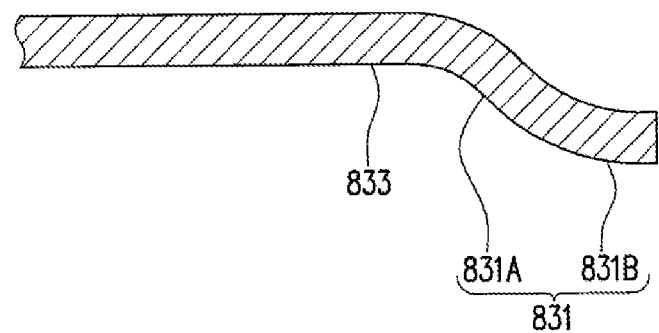
FIG. 13 is a cross-sectional view of a position XIII-XIII in FIG. 12.
Figure 14:
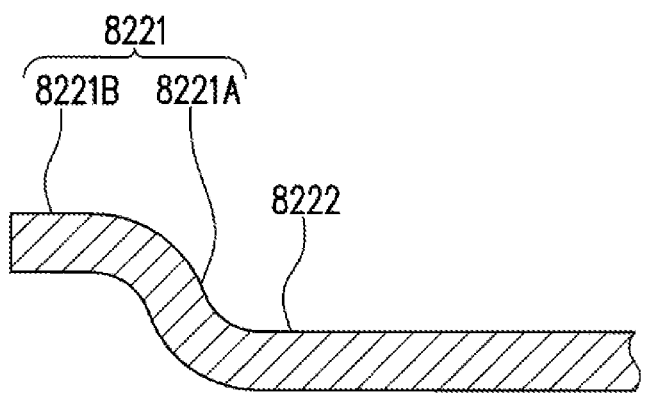
FIG. 14 is a cross-sectional view of a position XIV-XIV in FIG. 12.

Specifically, the fifth end portion 8221 has, in order from the adjacent site 8222 to the outside in the Y-axis direction, a third rib 8221A that bends toward the other side in the Z-axis direction with respect to the adjacent site 8222 and is continuous with the first rib 831A of the first site 831, and a fourth rib 8221B that bends outward in the Y-axis direction with respect to the third rib 8221A and is continuous with a second rib 831B of the first site 831 (cf. FIGS. 12 and 14).

An inner end portion 8223 in the Y-axis direction of each installation portion 822 is bent toward the other side in the Z-axis direction. The inner end portion 8223 of each installation portion 822 is continuous with the respective end portions 812, 8211 of the end member 81 and the extending portion 821, and constitutes an inner rib 80R of the first frame 80 together with the respective end portions 812, 8211 of the end member 81 and the extending portion 821.

Similarly to the energy storage apparatus 1 of the embodiment, each of the pair of first frames 80 configured as described above is disposed on each outer side of the plurality of energy storage devices 2 arranged in the X-axis direction to sandwich the adjacent member 3 between the first frame 80 and the energy storage device 2 (more specifically, the energy storage device 2 disposed on the outermost side in the X-axis direction) while being in contact with the adjacent member 3.

According to the energy storage apparatus provided with the first frame 80, the boundary portion B between the first site 831 and the second site 832 of the side end portion 83 is twisted, so that the energy storage apparatus has a spring property. Therefore, when in a state where the installation portion 822 is installed on the fixing surface (fixing object), the end member 81 is pressed by the energy storage device 2 by application of vibration or the like to the energy storage apparatus 1, and the first frame 80 is to deform so that the installation portion 822 is tilted to a fulcrum, the boundary portion B extends (i.e., deforms so that the twist returns), whereby the stress caused by the pressing is absorbed, and the damage of the first frame 80 is prevented.

In the energy storage apparatus, the fifth end portion 8221 of the installation portion 822 is continuous with the first site 831 at the side end portion 83 of the end member 81 and the extending portion 821 and is bent toward the side where the first site 831 is located with respect to the adjacent site 8222 of the installation portion 822. As described above, since the end portion in the Y-axis direction of the first frame 80 including the boundary portion between the extending portion 821 and the installation portion 822 (the first site 831 and the fifth end portion 8221) is bent with respect to the sites (adjacent sites 833, 8222) adjacent to the end portion in the Y-axis direction (forms a so-called rib shape), the strength of the boundary portion between the extending portion 821 and the installation portion 822 (bent site) can be ensured.

In the energy storage apparatus provided with the first frame 80, the side end portion 83 in which the boundary portion B between the first site 831 and the second site 832 is twisted is disposed at each end portion of the first frame 80 in the Y-axis direction, but the configuration is not limited thereto. The side end portion 83 in which the boundary portion B between the first site 831 and the second site 832 is twisted may be formed only at one end portion of the first frame 80 in the Y-axis direction. With such a structure as well, when the end member 81 of the first frame 80 is pressed by the energy storage device 2, the boundary portion B extends (deforms so that the twist returns), and hence the stress caused by the pressing is absorbed. This prevents damage to the first frame 80.

The position of the boundary portion B at the side end portion 83 is not limited. When the end member 81 is pressed by the energy storage device 2 in a state where the installation portion 822 is installed on the fixing surface and the first frame 80 is to deform so that the installation portion 822 is tilted to a fulcrum, in order to absorb the stress generated around the installation portion 822 of the first frame 80 and effectively prevent the stress concentration in the site (around the installation portion 822), it is preferable that the twist-shaped boundary portion B be disposed at a position of the side end portion 83 close to the installation portion 822.

However, when the twist-shaped boundary portion B is disposed at any position in the Z-axis direction at the side end portion 83, since the boundary portion B has a spring property, the boundary portion B deforms so that the twist of the boundary portion B returns when a force is applied from the energy storage device 2 or the like to the first frame 80 due to vibration or the like, whereby the stress generated around the boundary portion B in the first frame 80 is absorbed. This prevents damage to the first frame 80.

Further, in the energy storage apparatus including the first frame 80, the fifth end portion 8221 of the installation portion 822 is bent with respect to the adjacent site 8222 in a state continuous with the first site 831 of the side end portion 83, but the configuration is not limited thereto. The fifth end portion 8221 of the installation portion 822 may have a configuration not to bend with respect to the adjacent site 8222, that is, a straight configuration.

In the energy storage apparatus including the first frame 80, the first site 831 is bent outward in the X-axis direction with respect to the adjacent site 833, and the second site 832 is bent inward in the X-axis direction with respect to the adjacent site 833, but the configuration is not limited thereto. The first site 831 may be bent inward in the X-axis direction with respect to the adjacent site 833, and the second site 832 may be bent outward in the X-axis direction with respect to the adjacent site 833. In this case, the fifth end portion 8221 of the installation portion 822 is bent toward one side in the Z-axis direction.

Further, in the energy storage apparatus including the first frame 80, one boundary portion B (the twist-shaped site) is disposed at the side end portion 83, but a plurality of boundary portions B may be disposed. In this case, at the side end portion 83, there each or more of a site that bends outward in the X-axis direction with respect to the adjacent site 833 (a site corresponding to the first site 831) and a site that bends inward (a site corresponding to the second site 832) are arranged alternately in the Z-axis direction.

Further, in the energy storage apparatus including the first frame 80, the twist-shaped end portion (boundary portion B) is disposed at the outer end portion (side end portion 83) in the Y-axis direction of the first frame 80, but the configuration is not limited thereto. For example, the twist-shaped end portion (boundary portion B) may be disposed inside the Y-axis direction of the extending portion 821. That is, the twist-shaped end portion (boundary portion B) may be provided at the end portion 8211 of the extension 821 constituting the inner rib 80R.

Further, in the energy storage apparatus including the first frame 80, in the first frame 80, the installation portion 822 extends outward in the X-axis direction with respect to the end member 81, but the configuration is not limited to this. The installation portion 822 may extend inward in the X-axis direction with respect to the end member 81.

The installation portion 822 extends in the direction orthogonal to the end member 81 (the normal direction of the end member 81: the X-axis direction in the example of the above embodiment) but may extend in a direction inclined with respect to the end member 81 (a direction intersecting the normal direction).

Further, in the energy storage apparatus provided with the first frame 80, in the first frame 80, the space is formed between the pair of extending portions 821, that is, a part of the site of the first frame 80 excluding the installation portion 822 has a notched shape, but the configuration is not limited thereto. The site of the first frame 80 excluding the installation portion 822 may have a shape without a notch, such as a rectangular shape.

The invention claimed is:

1. An energy storage apparatus comprising:
   at least one energy storage device; and
   a holding member that holds the at least one energy storage device,
   wherein
   the holding member includes
      a first frame including an end member aligned with the at least one energy storage device in a first direction and an attachment portion connected to one end of the end member in a second direction orthogonal to the first direction,
      a second frame including a body aligned with the at least one energy storage device in a third direction orthogonal to the first direction and the second direction, and an extension extending from the body and extending along at least an outer surface of the end member, and
      a plurality of coupling portions that couple the first frame and the second frame in the first direction and are disposed in the extension at an interval in the second direction,
   the attachment portion includes an installation portion that is installed on a fixing surface to which the first frame is fixed,
   the plurality of coupling portions include a coupling portion closest to the installation portion and an other coupling portion in a view of the first direction of the first frame, and
   in the third direction, the other coupling portion is further apart from a center line extending in the second direction of the end member than the coupling portion closest to the installation portion.

2. The energy storage apparatus according to claim 1, wherein the other coupling portion is disposed on an imaginary straight line passing through the coupling portion closest to the installation portion and a fixing center of the installation portion in the view of the first direction of the first frame.

3. The energy storage apparatus according to claim 1, wherein
   the first frame includes a pair of first frames disposed on both sides of the at least one energy storage device in the first direction,
   the second frame includes a pair of second frames disposed on both sides of the at least one energy storage device in the third direction, and
   the plurality of coupling portions coupling one of the second frames and the first frame and the plurality of coupling portions coupling an other of the second frames and the first frame are symmetrically disposed with respect to a center line extending in the second direction of the end member of the first frame.

4. The energy storage apparatus according to claim 3, wherein
   the attachment portion includes a pair of legs disposed at an interval in the third direction and each extending in the second direction from the one end of the end member, and
   each of the pair of legs has
      a first end connected to the one end of the end member and including an extending portion that extends in the second direction from the one end of the end member, and
      a second end opposite to the first end and including the installation portion.

5. The energy storage apparatus according to claim 4, wherein at a side end portion that is an end portion in the end member and the extending portion in the third direction, a first site including an end portion on the installation portion side in the second direction and a second site adjacent to the first site in the second direction bend toward sides opposite to each other with respect to a site adjacent to the side end portion in the third direction in the end member and the extending portion, and a boundary portion between the first site and the second site is twisted.

6. The energy storage apparatus according to claim 5, wherein
   the leg includes the installation portion extending from a tip of the extending portion along the first direction, the installation portion being in a plate shape along a plane including the first direction and the third direction, and
   an installation-portion side end portion being the end portion in the third direction in the installation portion is continuous with the first site and bent toward a side where the first site is located with respect to a site adjacent to the installation-portion side end portion in the installation portion in the third direction.

7. An energy storage apparatus comprising:

at least one energy storage device; and a holding member that holds the at least one energy storage device, wherein the holding member includes a first frame including an end member aligned with the at least one energy storage device in a first direction and an attachment portion connected to one end of the end member in a second direction orthogonal to the first direction, a second frame including a body aligned with the at least one energy storage device in a third direction orthogonal to the first direction and the second direction, and an extension extending from the body and extending along at least an outer surface of the end member, and a plurality of coupling portions that couple the first frame and the second frame in the first direction and are disposed in the extension at an interval in the second direction, the attachment portion includes an installation portion that is installed on a fixing surface to which the first frame is fixed, the plurality of coupling portions include a coupling portion farthest from the installation portion and an other coupling portion in a view of the first direction of the first frame, the coupling portion farthest from the installation portion is further apart from a center line extending in the second direction of the end member in the third direction than the other coupling portion, and the other coupling portion is disposed on an imaginary straight line passing through the coupling portion farthest from the installation portion and a fixing center of the installation portion in the view of the first direction of the first frame.

* * * * *